April 28, 1936.   J. H. REIFENBERG   2,039,030

ELECTRIC WATER HEATING SYSTEM

Filed Jan. 11, 1935

WITNESSES:
Leon J. Jaja.
Alm. C. Groome

INVENTOR
Joseph H. Reifenberg.
BY
H M Bielul
ATTORNEY

Patented Apr. 28, 1936

2,039,030

UNITED STATES PATENT OFFICE 2,039,030

ELECTRIC WATER HEATING SYSTEM

Joseph H. Reifenberg, Mansfield, Ohio, assignor to Westinghouse Electric & Manufacturing Company, East Pittsburgh, Pa., a corporation of Pennsylvania Application January 11, 1935, Serial No. 1,296

14 Claims. (Cl. 219—38)

My invention relates to temperature control systems, and particularly to electric heating systems applied to water tanks.

An object of my invention is to provide an electric water heating system applicable to storage tanks for hot water that shall be particularly useful where off-peak heating rates are available.

Another object of my invention is to provide an electric water heating system having an upper and a lower heating element in cooperative relation with a water tank, the upper heater being adapted to be energized at any time, and the lower heater being adapted to be energized during off-peak hours only, the upper heater being prevented from becoming energized when the lower heater is energized, under certain operating conditions.

Another object of my invention is to provide an electric water heating system which includes means for varying the operating characteristics of one of a plurality of thermally controlled heating elements during a certain part of the day.

In practicing my invention, I provide in combination with a hot water tank, an upper electric heating element and a lower electric heating element, which heating elements may either extend into the tank or be located therearound. Thermal switches are operatively associated with the upper and the lower heaters to control the circuits thereof, the upper thermal switch having an auxiliary heating element in heat-transferring relation thereto, and in one form of system embodying my invention, the thermal switch of the upper heater additionally controls the energizing circuit of the lower heater. Since it is desired to take advantage of the lower rates for electric energy during off-peak hours, a time controlled switch is also provided in the energizing circuit of the lower heating element.

Figure 1:
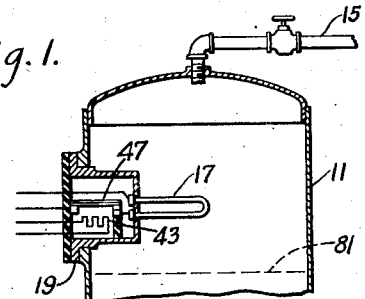
Figure 1 is a view, in section, showing an assembly of a hot water tank and an upper and a lower heating element associated therewith.

Referring first to Fig. 1 of the drawing, I have there illustrated generally only, a hot water tank 11 having a cold water inlet 13 and a hot water outlet 15, which may be located at the top of the tank. However, I do not wish to be limited to the particular showing of the location of the cold water inlet and the hot water outlet, since these constitute no particular part of my invention.

I provide an upper electric heating element 17 which may include a tubular metal-clad resistor of substantially U-shape having associated therewith a closure member 19 adapted to close the opening in the tank through which the heating element 17 extends. Any suitable or desired means of securing the water heater assembly against the tank may be provided.

I provide also a lower water heater 21, which may be of substantially the same kind as is the heater 17, and which may have the same current-carrying capacity as the upper heater, or may have a different current capacity, as may be found suitable or desirable. The lower heating element 21 may also be of the metal-clad type, and of substantially U-shape having a closure member 23 associated therewith, which may be secured against or over an opening in the wall of the tank through which heater 21 extends into the contents of the tank.

Figure 2:
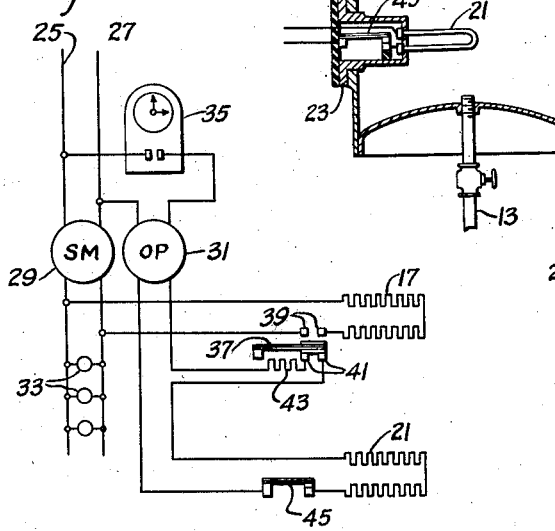
Fig. 2 is a diagram of connections of one system embodying my invention.

Referring now to Fig. 2 of the drawing, I have there shown one form of system embodying my invention. A pair of supply circuit conductors 25 and 27 are shown as illustrative of any suitable source of supply of electric energy. I have shown also an ordinary service meter 29 and an off-peak meter 31 so connected in circuit that the energy used by the upper heating element 17 will be registered only on meter 29, while the amount of electric energy used to energize the lower heater 21 will be registered only on meter 31. I have indicated a plurality of lamps 33 as being also connected back of the service meter 29 to illustrate that any other load in a home, such as incandescent lights, or small motors, is to be connected to the circuit through the service meter 29. In order to properly control the energization of the circuit whose energy consumption is registered on the off-peak meter 31, I provide a time-controlled switch 35, which is connected in series circuit relation relatively to the off-peak meter 31. As is well known in the art, devices of this kind are so adjusted that the switch controlled by device 35 is closed only during a certain part of the day, preferably during the night-time, when the load on the central station is likely to be a minimum, and when the central station may desire to increase the consumption of electric energy by charging a lower rate therefor.

The upper tank heater 17 has operatively associated therewith a thermostatic device here shown as including a bimetal element 37, one end of which is fixed and which is provided adjacent its other end, with a contact bridging member of such design that, in one operative position thereof, the contact bridging member on the bimetal bar engages substantially fixed contact members 39 to thereby establish an energizing circuit through coil or heater 17, while in the other operative position of the thermostatic switch, the contact members on the bimetal bar engage other fixed contact members 41, whereby to close another circuit. When the contact members on the bimetal bar engage fixed contact members 41, a circuit is established through a small auxiliary heating element 43 operatively associated with the thermal switch 37, and which is connected in series circuit relation with a lower thermostatic switch 45, which controls the circuit of the lower heater 21. In other words, when the thermal switch 37 is, say, in its upper operative position when contact members 39 are engaged, an energizing circuit through the upper heater 17 will be established, the consumption of energy in this heater being registered on meter 29. When the bimetal switch 37 is in its lower operative position where contact members 41 are engaged, as shown in Fig. 2 of the drawing, the upper heater 17 is deenergized, and the lower heater 21 is energized, providing, of course, that the time-controlled switch in device 35 is closed, and that the thermostatic switch 45 is also in its closed position, which latter will be the case if the temperature of the water surrounding the lower heater and the thermostat 45 are at a sufficiently low temperature. As illustrative of the operating temperature of thermostatic switch 37, and of thermostatic switch 45, it may be noted that a temperature on the order of 160° F. has been found suitable.

Figure 3:
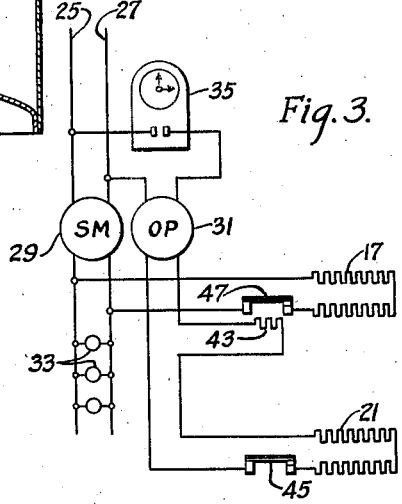
Fig. 3 is a diagram of connections of a modified system embodying my invention.

Referring now to Fig. 3 of the drawing, I have there illustrated a modified form of system embodying my invention, including the same or equivalent supply circuit conductors, service meter 29, an off-peak meter 31, connected in substantially the same manner as hereinbefore described in connection with Fig. 2 of the drawing. An upper tank heater 17 has operatively associated therewith an upper thermostatic switch 47, which is of the single contact kind, that is, it controls only the energizing circuit of upper tank heater 17. A lower tank heater 21 is provided and may be controlled by a thermostatic switch 45, which is the same as was hereinbefore described in connection with the system shown in Fig. 2 of the drawing. In all other respects, the connections are the same as were hereinbefore described in connection with Fig. 2 of the drawing. A time-controlled switch 35 is provided and is connected in series circuit relation with the off-peak meter 31 and the lower tank heater 21.

I provide also a small auxiliary heater 43 in operative relation to the upper thermostat 47, which auxiliary heater is connected in series circuit relation with the thermostatic switch 45, the lower heater 21, the meter 31 and the time-controlled switch 35.

Figure 4:
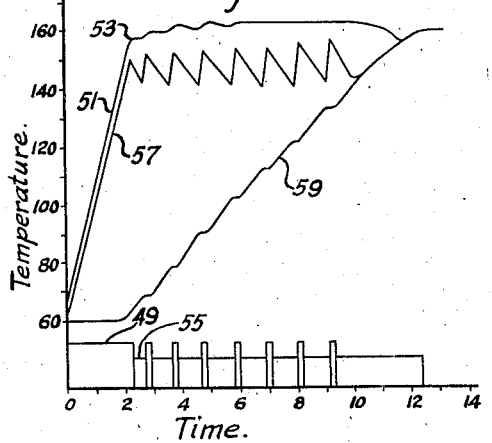
Figs. 4 and 5 are curves illustrating the operation of an older form of system and of the system embodying my invention.

In order to show the operation of a system embodying my invention of the kind shown in Fig. 2 of the drawing, I have illustrated in Fig. 4 of the drawing the operation of an older system, in which the small auxiliary heater 43 is not used. It may here be noted that the curves shown in Fig. 4 of the drawing have been obtained by the use of a system of the kind shown in Fig. 2 of the drawing, but as has just been stated, with the omission of the small auxiliary heater 43. The area indicated by numeral 49 represents the amount of electric energy transformed into heat in the upper tank heater, the rise in temperature of a test thermostat located at the top of the tank being shown by curve 51. At a point 53 on curve 51, which corresponds substantially to a temperature of 160°, the circuit of the upper heater was interrupted and the circuit of the lower heater was closed, for a predetermined short length of time. The amount of energy translated into heat in the lower heater is indicated by the rectangle designated by the numeral 55.

The temperature of the water in the tank at the level of the upper heater is shown by curve 57, from which it will be noted that the temperature values are only slightly below those of the water in the upper part of the tank. Curve 59 represents the temperature of the water at a level midway between the upper and the lower heater.

It will be noted that the lower heater was energized for only a relatively short period of time, the temperature of the water controlling the upper thermostat 37 dropping until this thermostat reclosed the circuit of the upper heater after opening the circuit of the lower heater. The energized upper heater quickly raised the temperature of the water in the upper part of the tank until the temperature of the thermostat 37 reached a value at which the thermostat deenergized the upper heater and reenergized the lower heater. This sequential alternate energization of the two heaters continued for a length of time sufficient to raise the temperature of all of the water in the tank to substantially 160° F. when both heaters were deenergized. The alternate energization of the two heaters is reflected in the three curves and it will be noted that the temperature variation in the water surrounding and, therefore, controlling thermostat 37 is on the order of 10° to 15° F.

It is to be noted that the curves of Fig. 4 were obtained during an off-peak period, that there was no withdrawal of hot water from the tank, and further, that the test was started with a tank filled with cold water.

Figure 5:
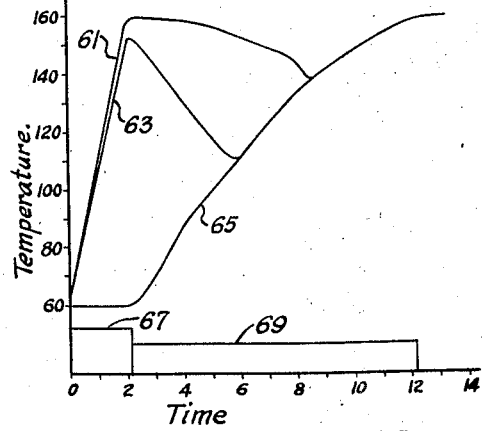

Fig. 5 of the drawing shows the operation of the system of Fig. 2 under the same conditions as existed for the test which resulted in the curves of Fig. 4, that is, the curves of Fig. 5 were obtained when the auxiliary heater 43 was provided and used. Temperature curves 61, 63 and 65 correspond to curves 51, 57 and 59 of Fig. 4 as to the location of the water levels where the temperatures were measured. The rectangle 67 indicates the amount of electric energy translated into heat by the upper heating element to raise the temperature of the water level with the upper heater to substantially 153°, at which temperature the thermostat 37 deenergized the upper heater and energized the lower heater. Rectangle 69 indicates the amount of electric energy translated into heat by the lower heater 21.

It will be noted that the heat from the auxiliary heater 43 is added to the heat affecting thermostat 37 so that a much greater drop in the temperature of the water surrounding the thermostat 37 is necessary to cause it to deenergize the lower heater and reenergize the upper heater. When the lower heater 21 was energized it, of course, caused a circulation of the water in the tank, and while the temperature of the water in the plane of the upper heater dropped because of this circulation, it did not drop enough to cause the thermostat 37 to deenergize the lower heater and to reenergize the upper heater.

The lower heater therefore predominated in the work of heating the water in the tank, thereby reducing the cost of heating the contents of the tank.

It will be noted from an inspection of the curves shown in Fig. 5 of the drawing, that the upper heater was not reenergized after it had once been deenergized, this being for the reason that the small auxiliary heater 43 provided sufficient heat to raise the temperature of the thermostatic switch 37 by an amount on the order of 20° F. In other words, it would have been necessary for the water in the tank ambient to the upper thermostatic switch 37 to experience a decrease in its temperature 20° greater than before, in order to cause actuation of the upper thermostatic switch to a position where it would reenergize the upper heater. This did not occur, as is evident from an inspection of curve 63, so that a better use was made of the off-peak heating element.

If it be assumed that the tank 11 has just been installed, the respective heaters connected to the supply and control circuit, as shown, say, in Fig. 2 of the drawing, and that this has been done during the on-peak period of the day, it is evident that it will be impossible to cause energization of the lower heating element 21 because of the open circuit position of the contact members in the time-controlled switch 35. The upper heater 17 will, therefore, be effective to cause a rise in the temperature of the water in the upper part of the tank, and approximately down to the line 81, until the temperature of the water ambient to thermostat 37 reaches its operating temperature, which, as has hereinbefore been stated, is approximately 160° F. It will, therefore, be possible to withdraw small quantities only of hot water from the tank until an off-peak period occurs, when it will be possible for the hereinbefore-described action to occur, in which the lower heater will be energized and gradually raise the temperature first of the water in that part of the tank below line 81, and then, if necessary, to raise the temperature of all of the water in the tank, it being understood that some mixing of the water in the upper part of the tank above level 81 and of the water below level 81 will occur in time. After the contents of the tank have been heated to the desired adjusted temperature, the same general cycle of operation, as has already been set forth, will take place, the energization of the lower heating element being, of course, dependent, in addition to the temperature of the ambient water, upon the off-peak period of the day.

The system embodying my invention thus enables a user of a hot water tank having associated therewith a heating system embodying my invention, which will depend to a greater extent upon the off-peak heater and will, therefore, enable the user to take advantage of the usual lower rates for an off-peak heater. It is obvious that the capacity of the tank should be selected with a view to providing such a quantity of water as can be properly heated to the desired temperature during the off-peak time, so that a lesser use may be made of the on-peak upper heater during the on-peak period.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A water heating system comprising in combination with a tank, an upper and a lower heater element therefor, thermostatic switches responding to the temperature of the ambient water and controlling the energization of the respective heater elements and means controlled by the thermostatic switch associated with the lower heater element for preventing reenergization of the upper heater element when the water temperature in the top of the tank reaches a predetermined low value which would otherwise cause the top thermostat to close.

2. A water heating system comprising in combination with a tank, an upper and a lower heating element therefor, upper and lower thermostatic switches responsive to the temperature of the ambient water and controlling the energization of the respective heating elements and means controlled by the thermostatic switch controlling the energization of the lower heating element for causing the upper thermostatic switch to operate at a temperature value differing from that of the ambient medium.

3. A water heating system comprising in combination with a tank, an upper and a lower heating element therefor, upper and lower thermostatic switches responsive to the temperature of the ambient water and controlling the energization of the respective heating elements and means controlled by the thermostatic switch controlling the energization of the lower heating element for causing the upper thermostatic switch to effect reenergization of the upper heating element at a temperature value differing from that of the ambient medium.

4. A water heating system comprising in combination with a tank, an upper and a lower heating element therefor, an upper thermostatic switch controlling the energization of the upper heating element, a lower thermostatic switch controlling the energization of the lower heating element and means controlled by the thermostatic switch controlling the lower heating element for causing the upper thermostatic switch to reenergize the upper heating element at a temperature value of the ambient water that is lower than the temperature of the thermostatic switch.

5. A device as set forth in claim 2 in which said means controlled by the lower thermostatic switch comprises an auxiliary heating element in heat transferring relation to the upper thermostatic switch.

6. A water heating system comprising in combination with a water tank, an upper heating element, a lower heating element therefor, an upper thermostatic switch operable from closed to open position upon a predetermined change of temperature of an ambient medium and controlling the upper heater, a lower thermostatic switch controlling the lower heater and means controlled by the lower thermostatic switch for preventing reclosing of the upper thermostatic switch until a greater change of temperature of the ambient medium than said predetermined change occurs.

7. A device as set forth in claim 6 in which the means controlled by the lower thermostatic switch comprises an auxiliary heating element in heat transferring relation to the upper thermostatic switch.

8. A device as set forth in claim 6 in which the means controlled by the lower thermostatic switch comprises an auxiliary heating element in heat transferring relation to the upper thermostatic switch and in series circuit relation with the lower heating element.

9. A water heating system comprising in combination with a tank an upper and a lower heating element therefor, a thermostatic switch in the upper end of the tank controlling the energization of the upper heating element and means controlled in accordance with the energization of the lower heating element for causing the thermostatic switch in the upper end of the tank to operate at a temperature value different than that of the ambient medium.

10. A water heating system comprising in combination with a tank an upper and a lower heating element therefor, a thermostatic switch in the upper end of the tank controlling the energization of the upper heating element and an auxiliary heater in heat transferring relation to the thermostatic switch in the upper end of the tank and connected in series circuit with the lower heating element.

11. A water heating system comprising in combination with a tank, an upper and a lower heating element therefor, a first thermostatic switch in the upper end of the tank controlling the energization of the upper heating element, a second thermostatic switch in the lower end of the tank controlling the energization of the lower heater and an auxiliary heater in heat transferring relation to the upper thermostatic switch, connected in series circuit with the lower thermostatic switch and the lower heater to raise the temperature of the upper thermostatic switch above the temperature of the ambient medium when the lower heating element is energized.

12. A water heating system comprising in combination with a tank, an upper and a lower heating element therefor, a first thermostatic switch in the upper end of the tank controlling the energization of the upper heating element, a second thermostatic switch in the lower end of the tank controlling the energization of the lower heater, a time-switch controlling the energization of the lower heating element and means controlled by the time switch and the second thermostatic switch to cause operation of the first thermostatic switch at a temperature different than that of the medium surrounding the first thermostatic switch.

13. A water heating system comprising in combination with a tank, an on-peak heating element, an off-peak heating element, a time switch controlling the energization of the off-peak heater, a thermostatic switch controlling the energization of the on-peak heating element and operable from open position to closed position at a predetermined low value of temperature of the ambient medium and means controlled by the time switch to cause the thermostatic switch to move from open to closed position at a lower temperature of the ambient medium than said predetermined value during on-peak time.

14. A system as set forth in claim 6 and including a time-controlled switch in series circuit relation with the lower heater, and the lower thermostatic switch to effect control thereof in accordance with time.

JOS. H. REIFENBERG.